United States Patent
Qi et al.

(10) Patent No.: US 10,324,929 B2
(45) Date of Patent: Jun. 18, 2019

(54) PROVISION OF POSITION DATA FOR QUERY RUNTIME ERRORS

(71) Applicant: SAP SE, Walldorf (DE)

(72) Inventors: Weimin Qi, XiAn Shaanxi (CN); Jaehyok Chong, Seoul (KR); Kihong Kim, Seoul (KR); Yu Wang, XiAn Shaanxi (CN); Di Wu, Seoul (KR)

(73) Assignee: SAP SE, Walldorf (DE)

( * ) Notice: Subject to any disclaimer, the term of this patent is extended or adjusted under 35 U.S.C. 154(b) by 320 days.

(21) Appl. No.: 15/339,615

(22) Filed: Oct. 31, 2016

(65) Prior Publication Data

US 2018/0121326 A1 May 3, 2018

(51) Int. Cl.
| | |
|---|---|
| *G06F 17/30* | (2006.01) |
| *G06F 16/2453* | (2019.01) |
| *G06F 11/36* | (2006.01) |
| *G06F 8/41* | (2018.01) |

(52) U.S. Cl.
CPC .... *G06F 16/24542* (2019.01); *G06F 11/3628* (2013.01); *G06F 11/3636* (2013.01); *G06F 16/24549* (2019.01); *G06F 8/427* (2013.01)

(58) Field of Classification Search
CPC ......... G06F 17/30445; G06F 17/30463; G06F 17/30536; G06F 17/30474; G06F 11/3628; G06F 11/3636; G06F 11/3644; G06F 11/3664; G06F 16/24549; G06F 16/244542
USPC ........................................................ 707/718
See application file for complete search history.

(56) References Cited

U.S. PATENT DOCUMENTS

| | | | |
|---|---|---|---|
| 5,875,334 A * | 2/1999 | Chow ..................... | G06F 8/427 717/141 |
| 7,778,996 B2 * | 8/2010 | Burger .............. | G06F 17/30536 707/713 |
| 9,292,373 B2 * | 3/2016 | Ercegovac .......... | G06F 11/0727 |
| 9,424,119 B2 * | 8/2016 | Ercegovac .......... | G06F 11/0727 |
| 2004/0117359 A1* | 6/2004 | Snodgrass ......... | G06F 17/30463 |
| 2007/0190978 A1* | 8/2007 | White ................... | H04L 51/063 455/412.1 |
| 2008/0010240 A1* | 1/2008 | Zait .................... | G06F 17/30463 |
| 2010/0057727 A1* | 3/2010 | Srinivasan ............... | G06K 9/62 707/E17.017 |
| 2010/0057735 A1* | 3/2010 | Srinivasan ............... | G06K 9/62 707/E17.014 |

(Continued)

*Primary Examiner* — Jean M Corrielus
(74) *Attorney, Agent, or Firm* — Buckley, Maschoff & Talwalkar LLC

(57) ABSTRACT

A query is parsed and positions of symbols of the query are determined. A parse tree including the positions of the symbols is generated based on the parsed query. The parse tree is sent to a DBMS optimizer. The parse tree is transformed into an optimizer tree. The optimizer tree includes the positions of the symbols of the query.

Based on the optimizer tree, a query execution plan is generated for the execution of the query. The positions of the symbols of the query is copied from the optimizer tree into the query execution plan. The query execution plan is sent to a query execution engine.

The query is executed in accordance with the query execution plan. When a runtime error is detected, an exception message associated with the runtime error is displayed. The error message includes an error code and the positions of the symbols of the query.

12 Claims, 6 Drawing Sheets

(56) References Cited

U.S. PATENT DOCUMENTS

| | | | |
|---|---|---|---|
| 2010/0057736 A1* | 3/2010 | Srinivasan | G06K 9/62 |
| | | | 707/E17.014 |
| 2010/0057737 A1* | 3/2010 | Srinivasan | G06K 9/62 |
| | | | 707/E17.039 |
| 2010/0198807 A1* | 8/2010 | Kuno | G06F 17/30463 |
| | | | 707/713 |
| 2010/0198811 A1* | 8/2010 | Wiener | G06F 17/30463 |
| | | | 707/718 |
| 2011/0125730 A1* | 5/2011 | Bordawekar | G06F 17/30445 |
| | | | 707/718 |
| 2014/0281746 A1* | 9/2014 | Ercegovac | G06F 11/0727 |
| | | | 714/48 |
| 2014/0281748 A1* | 9/2014 | Ercegovac | G06F 11/0727 |
| | | | 714/49 |

* cited by examiner

FIG. 1

```
ROW SEARCH ;
TO_DECIMAL(T2.B) / TO_DECIMAL(T2.A)
PROJECT:
[0000:0640]..<LIST>: 1 nodes {
[0000:05b0]....int32_t(16,6) __copy__ {__copy__ Fixed8} ( --- <QERQ/17/4B> @8
[0000:03e0]......Fixed8(16,6) /(__div__ Fixed8} ( --- <XRRQ/14/16B> @8
[0000:0480]........Decimal __typecast__ {to_Decimal_Integer} ( --- (implicit) <AR/6/16B> @7
[0000:0280]..........Integer(10) __field__ Integer) ( --- <QQdd/5/8B> @8
[0000:0208]............void* __rids__ ,"(normal) --- <NOP/0/8B> @8
[0000:0230]............int32_t(10) const = 0(int32_t) --- <LOAD/3/4B> @8
[0000:0258]............int32_t(10) const = 3(int32_t) --- <LOAD/4/4B> @8
[......[......]......]
[0000:04f0]........Decimal __typecast__ {to_Decimal_TinyInt} ( --- (implicit) <AR/11/16B> @13
[0000:0370]..........TinyInt(3) __field__ TinyInt) ( --- <QQdd/10/2B> @13
[0000:02f0]............void* __rids__ ,"(normal) --- <NOP/0/8B> @13
[0000:0318]............int32_t(10) const = 0(int32_t) --- <LOAD/8/4B> @13
[0000:0340]............int32_t(10) const = 1(int32_t) --- <LOAD/9/4B> @13
[......[......]......]
[0000:0670]........int32_t(10) const = 6(int32_t) --- <LOAD/13/4B> @8
[......]
[0000:0580]......int32_t(10) const = 6(int32_t) --- <LOAD/16/4B> @8
[......]
[......]}
```

FIG. 2A

```
STREAM_EXPR0:
[0000:05b0]..int32_t(16,6) __copy__{__copy__Fixed8} ( --- <QERQ/17/4B> @8
[0000:03e0]...Fixed8(16,6) /{_div__Fixed8} ( --- <XRRQ/14/16B> @8
[0000:0480].....Decimal__typecast__{to_Decimal_Integer} ( --- (implicit) <AR/6/16B> @8
[0000:0280]......Integer(10) ___Integer_{__field__Integer} --- (implicit) <QQdd/5/8B> @8
[0000:0208].......void* __rids__" (normal) --- <NOP/0/8B> @8
[0000:0230]........int32_t(10) const = 0(int32_t) --- <LOAD/3/4B> @8
[0000:0258]........int32_t(10) const = 3(int32_t) --- <LOAD/4/4B> @8
[.....:....]....
[0000:04f0]....Decimal__typecast__{to_Decimal_TinyInt} ( --- (implicit) <AR/11/16B> @13
[0000:0370]......TinyInt(3) ___TinyInt_{__field__TinyInt} ( --- <QQdd/10/2B> @13
[0000:02f0]......void* __rids__" (normal) --- <NOP/0/8B> @13
[0000:0318]........int32_t(10) const = 0(int32_t) --- <LOAD/8/4B> @13
[0000:0340]........int32_t(10) const = 1(int32_t) --- <LOAD/9/4B> @13
[.....:....]....
[0000:0670]......int32_t(10) const = 6(int32_t) --- <LOAD/13/4B> @8
[0000:0580]......int32_t(10) const = 6(int32_t) --- <LOAD/16/4B> @8
[.....:....]....

TABLE SCAN ;
FILTER CONDITION: T2.B > 0
FILTER:
[0000:0130]..Boolean >{__gt__Integer_Integer} ( --- <QRr/7/2B> @32
[0000:0090]...Integer(10) ___Integer_{__field__Integer} ( --- <QQdd/5/8B> @32
[0000:0010]....void* __rids__" (normal) --- <NOP/0/8B> @32
[0000:0038].....int32_t(10) const = 0(int32_t) --- <LOAD/3/4B> @32
[0000:0060].....int32_t(10) const = 3(int32_t) --- <LOAD/4/4B> @32
[.....:....]....
[0000:01a0]...Integer const __typecast__{to_Integer_int32_t} ( --- (implicit) <CONSTQ/6/8B> @37
[0000:0100]....int32_t(1) const = 0(int32_t) --- <LOAD/./4B> @37
[.....:....]....
```

PROVISION OF POSITION DATA FOR QUERY RUNTIME ERRORS

FIELD

Embodiments described herein generally relate to computer systems and methods for locating an error while executing a request for data by a database management system.

BACKGROUND

Easiness of debugging of query errors is an important characteristic of a database management system (DBMS). Query errors that may occur in a DBMS may include parsing errors, semantic check failures and runtime errors. Typically, a DBMS provides an error code when a parsing error or a semantic check failure is detected. Additionally, the DBMS provides position information for the error. The error position information shows position of a symbol causing the error in the query. This way, debugging of parsing errors and semantic check failures is eased and accelerated.

When a runtime error is detected, an error code and an error description are provided. However, despite this information about the errors, debugging of runtime errors for long and complicated queries remains cumbersome and time consuming.

SUMMARY

Various embodiments of systems and methods provision of position data for query runtime errors are described herein.

These and other benefits and features of embodiments will be apparent upon consideration of the following detailed description of preferred embodiments thereof, presented in connection with the following drawings.

Described is a system and method for providing position information in an exception message for a runtime error. When a request to execute a query is received, the query is scanned to determine position of a symbol or group of symbols in the query. The determined position is included in a parse tree that is generated based on the query.

The parse tree is sent to an optimizer. The optimizer converts the parse tree into an optimizer tree. The optimizer includes the position information from the parse tree into the optimizer tree.

A query execution plan is generated for execution of the query. The query execution plan is based on the optimizer tree. The position information is copied from the optimizer tree to the query execution plan.

The query execution plan is sent to a query execution engine. The query is executed in accordance with the query execution plan. When a runtime error is detected, an exception message associated with the runtime error is displayed. The exception message includes an error code and the position information.

By providing position information along with error code in exception messages of runtime errors, debugging of the runtime errors is eased. A position of the symbol or the group of symbols causing the runtime error is identified and the process of debugging is significantly accelerated.

Provision of position data for query runtime errors applies generally across different database systems and provides valuable information for users. Passing parse tree information through to the optimizer tree and the query execution plan provides more information on error messages and thus significantly reduces time and effort for debugging the error messages.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIGS. 2A-B are portions of one exemplary execution plan trace representing trace data for a query execution plan that includes position information, according to one embodiment.

DETAILED DESCRIPTION

Embodiments of techniques for provision of position data for query runtime errors are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
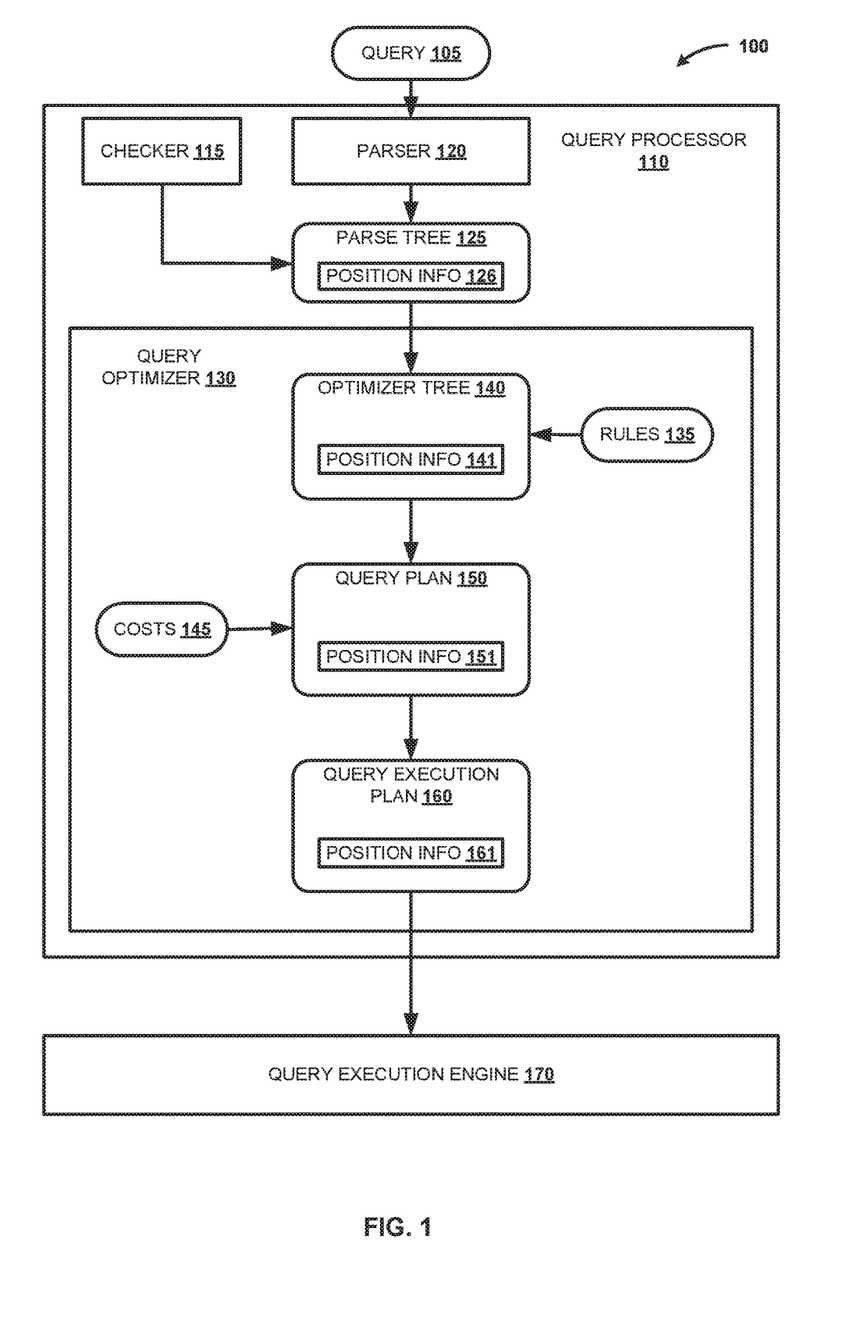
FIG. 1 is a block diagram illustrating architecture of a system that provides position information for runtime errors, according to one embodiment.

FIG. 1 is a block diagram illustrating architecture of system 100 that provides position information for runtime errors, according to one embodiment. System 100 includes query processor 110 and query execution engine 170. It should be appreciated, however, that system 100 might include other elements not illustrated in FIG. 1. System 100 is a database management system (DBMS), according to one embodiment. Query processor 110 processes queries such as query 105. Query 105 represents a request for data that is sent to system 100. Query processor 110 sends processed queries to query execution engine 170 for execution. In one embodiment, query processor 110 includes parser 120, checker 115 and query optimizer 130.

In one embodiment, query 105 represents a string of symbols including, but not limited to, upper and/or lower case Latin letters (A-Z), digits (0-9), and special characters such as space character, left and right parenthesis, single and/or double quote mark, percent sign, ampersand, multiplication sign, division sign, plus sign, minus sign (e.g., dash), comma, period, colon, semicolon, etc. For example, query 105 may be a query string such as the following:
    create table t2 (a tinyint, b int);
    insert into t2 values (0, 1);
    select t2.b/t2.a from t2 where t2.b>0.

Further, a query may include one or more tokens. A token is a symbol or a group of symbols of query 105 that is recognized as a single unit by parser 120. A token may be a letter, a keyword, an identifier, or a special character including but not limited to the special characters described above.

In one embodiment, parser 120 parses query 105. Parser 120 scans query 105 to check for syntactic correctness. For example, when query 105 is a structured query language (SQL) query string, parser 120 checks query 105 syntactically in accordance with SQL grammar. Based on the scanning, parser 120 determines positions of the symbols of query 105.

In one embodiment, parser 120 generates parse tree 125 based on query 105. Parse tree 125 is a data structure stored in memory that represents query 105 in accordance with a corresponding grammar. For example, when query 105 is an SQL query, parse tree 125 represents syntactically query 105 in accordance with the SQL grammar. Query 105 is transformed into the parse tree 125 data structure, according to one embodiment. In one embodiment, parse tree 125 is an algebraic syntactic data structure representation of query 105, according to the SQL grammar. Parse tree 125 contains annotations to one or more objects referenced in query 105. Further, parse tree 125 includes the determined positions of the symbols of query 105. In one embodiment, the position information for the number of symbols is stored in position info 126 field. Position info 126 is part of the parse tree 125 data structure. Below is an exemplary parse tree 125 that is generated based on query 105. In one embodiment, a graphical representation of a tree can be generated out of parse tree 125. For example, a user interface (UI) (not illustrated) of system 100 can generate the graphical representation. The position information <row, column> at a line of parse tree 125 shows position of a starting symbol of a token of query 105 that corresponds to a statement included in this line of parse tree 125. The following example illustrates parse tree 125:

```
qp_select <1, 1>
    qp_select_block<1, 1>
        qp_expr_item<1, 8>
            qp_expr_div <1, 8>
                qp_expr_column(T2.B) <1, 8>
                qp_expr_column(T2.A) <1, 13>
    qp_from_block<1, 18>
        qp_table_ref (T2) <1, 23>
    qp_where_block<1, 26>
        qp_simple_comp <1, 32>
            qp_expr_column(T2.B) <1, 32>
            qp_expr_const(0) <1, 37>
```

In this example, line "qp_expr_item<1, 8>" of parse tree 125 corresponds to the expression "t2.b" that is part of the "SELECT" statement row of query 105 (e.g., "Select t2.b/t2.a from t2 where t2.b>0."). To determine <row, column> position of symbols of query 105, parser 120 assigns consecutive row and column numbers to symbols included in a statement of query 105. Accordingly, a first symbol of the "SELECT" statement receives position "<1, 1>" (row 1, column 1). Similarly, since the first symbol of the above-mentioned expression "t2.b" (e.g., "t") is the eighth consecutive symbol (e.g., eighth column) of the "SELECT" statement row, "t" is assigned position "<1, 8>". When a statement of a query is longer than a single row, parser 120 assigns positions "<2, y>" for symbols on a second row, "<3, y>" for symbols on a third row, etc.

In one embodiment, when parse tree 125 is generated, checker module 115 traverses parse tree 125 to check for semantic correctness. That is, checker module 115 checks whether table names in query 105 refer to existing tables. Additionally, checker module 115 verifies that columns of database tables referred by query 105 are defined for the corresponding database tables.

In one embodiment, query optimizer 130 transforms parse tree 125 into optimizer tree 140. Query optimizer 130 rewrites parse tree 125 into optimizer tree 140 by replacing predicates with relational operators and substituting object identifiers with object names where necessary. For example, query optimizer 130 rewrites parse tree 125 into the following exemplary optimizer tree:

```
PROJECT
SELECT REF(T2.B)<1, 8> > CONST(0, @0x00002ab068eeb380)<1, 37>
TABLE: T2(A, B)
```

Execution of queries is optimized by determining the most efficient (e.g., fastest) order of execution of relational operators included in the queries. Therefore, when rewriting parse tree 125 into optimizer tree 140, query optimizer 130 includes into optimizer tree 140 portions of parse tree 125 that correspond to relational operators. Query optimizer 130 omits other portions of parse tree 125 that do not correspond to relational operators. Thus, optimizer tree 140 includes portions of parse tree 125 that correspond to the relational operator "SELECT", as shown in the example above.

In one embodiment, query optimizer 130 implements a number of functionalities including but not limited to generating optimizer tree 140 from parse tree 125, selecting query plan 150 from a number of alternative query plans based on optimizer tree 140, and generating query execution plan 160 from query plan 150. Optimizer tree 140 and query execution plan 160 can be viewed as runtime objects generated by query optimizer 130. A runtime object includes one or more fields to store data and one or more procedures or methods. The runtime object is defined by a corresponding portion of source code. For example, source code of optimizer 130 includes portions of source code that define optimizer trees such as optimizer tree 140, alternative query plans such as query plan 150, and query execution plans such as query execution plan 160. Query optimizer 130 generates optimizer tree 140 in accordance with a corresponding portion of source code that defines fields and procedures of optimizer tree 140.

In one embodiment, the portion of source code defining optimizer trees includes a field that stores position information, among others. Therefore, during generation of optimizer tree 140, query optimizer 130 copies the position information for the symbols of query 105 from parse tree 125. Query optimizer 130 includes the position information in the position information field of optimizer tree 140 (e.g., position info 141). With regard to optimizer tree 140 presented above, the position information <row, column> positioned at the end of expressions included in optimizer tree 140 shows position of a starting symbol of a token of query 105 that is associated with the corresponding relational operator "SELECT".

In one embodiment, optimizer tree 140 is simplified. Optimizer tree 140 includes one or more relational operators such as projection, selection, join, aggregation, etc. For example, optimizer tree 140 includes the relational operator "SELECT". A number of rules can be applied when optimizer tree 140 is simplified. In one embodiment, rules 135 module includes such rules for simplifying optimizer tree 140. For example, upon applying a rule from rules 135 module, one or more negation operators that might be included in optimizer tree 140 are distributed into Boolean expressions. Similarly, upon applying another rule from rules 135 module, one or more references to tables in optimizer tree 140 are replaced with corresponding queries. Below is an example of a simplified optimizer tree 140. In one embodiment, a graphical representation of a tree can be generated out of simplified optimizer tree 140. For example, a user interface (UI) (not illustrated) of system 100 can generate the graphical representation:

PROJECT (opId:0) (TO_DECIMAL((1000000, 1))<1, 8>/TO_DECIMAL((1000000, 0))<1, 13>)<1, 8> result_size: 1 subtree_cost: 1.22486755e-06

TABLE T2 (0) (opId:2) FILTER: (0, 1)>0 TABLE used cols:: 0, 1 TABLE histo cols:: 1 TABLE key joined cols:: input_size: 1 result_size: 1 output_column_size:2 subtree_cost:4.0384585e-07

In one embodiment, the position information <row, column> positioned at the end of expressions included in optimizer tree 140 shows position of a starting symbol of a token of query 105 that is associated with the corresponding relational operator "SELECT".

In one embodiment, query optimizer 130 evaluates a number of alternative query plans for execution of query 105. The number of alternative query plans is based on the one or more relational operators included in optimizer tree 140. Optimizer tree 140 is a data structure stored in memory (e.g., in an in-memory database) that represents the transformed parse tree 125 including the parsed query tokens and the corresponding position information for the symbols of the parsed query tokens. Alternative query plans represent possible variations of order of execution of the relational operators and the corresponding expressions of optimizer tree 140. An alternative query plan of the number of alternative query plans represents one such variant of the order of execution of the one or more relational operators of optimizer tree 140.

In one embodiment, a portion of source code describing alternative query plans defines a field that stores position information, among others. Therefore, during evaluation of alternative query plans based on optimizer tree 140, query optimizer 130 copies the position information for the symbols of query 105.

In one embodiment, query optimizer 130 computes logical alternatives to optimizer tree 140. Similarly, query optimizer 130 computes available algorithms for the one or more relational operators included in optimizer tree 140. Based on the computations, query optimizer 130 assigns costs to the number of alternative query plans. Standard methods for calculating costs of query plans can be utilized when assigning costs to the alternative query plans. Costs 145 module of the query optimizer 130 stores the assigned costs for the alternative query plans, according to one embodiment.

In one embodiment, query plan 150 is selected as the query plan with the lowest cost from the number of alternative query plans. Further, query plan 150 includes the position information field (e.g., position info 151). Position info 151 stores the position information for the symbols of the number of tokens of query 105.

In one embodiment, query optimizer 130 generates query execution plan 160 based on the selected query plan 150.

Query execution plan 160 is generated for execution of query 105. Query optimizer 130 is configured to add position information for the symbols of the number of tokens of query 105 to query execution plan 160. Query optimizer 130 transfers the position information from position info 151 to a corresponding position information field of query execution plan 160. For example, the portion of source code describing query execution plans defines a field that stores position information. Thus, when query execution plan 160 is generated based on the selected query plan 150, query optimizer 130 copies the position information for the symbols of query 105. Position info 161 of query execution plan 160 stores the position information for the symbols of the number of tokens, according to one embodiment.

In one embodiment, query optimizer 130 sends query execution plan 160 to query execution engine 170. Query execution engine 170 executes query 105 in accordance with query execution plan 160. Query execution plan 160 includes position info 161. Position info 161 stores the position of the symbols of the number of tokens of query 105. When a runtime error occurs, query execution engine 170 provides information for the runtime error. Query execution engine 170 reads information from one or more fields of the query execution plan 160 runtime object and provides information for the runtime error accordingly. Query execution engine 170 includes the information from the position information field of query execution plan 160 in an exception message associated with the runtime error. The exception message includes position information from position info 161, according to one embodiment.

By providing position information together with error code when a runtime error is detected, debugging of runtime errors is eased and significantly accelerated.

Figure 2A:
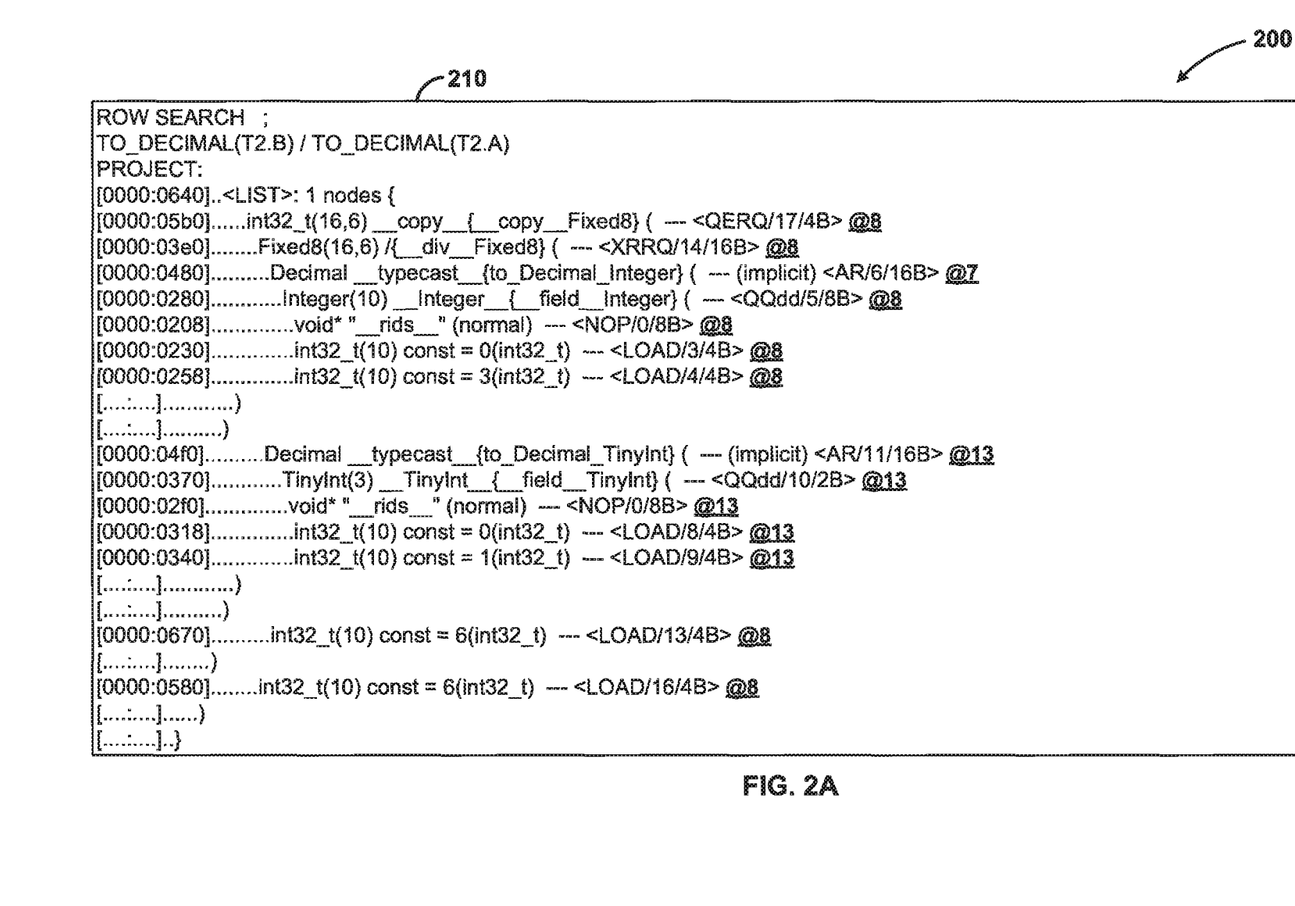

FIGS. 2A-B are portions of one exemplary execution plan trace 200 representing trace data for a query execution plan that includes position information, according to one embodiment. Trace data represents recorded information for execution of a query plan. Such information is valuable for programmers when debugging errors that have occurred during the execution of the query plan. FIG. 2A represents a first part 210 of execution plan trace 200. FIG. 2B represents a second part 220 of execution plan trace 200. For example, exemplary execution plan trace 200 represents trace data for query execution plan 160 described above with reference to FIG. 1. The query execution plan includes position information for a number of symbols included in a query. In one embodiment, portions of exemplary execution plan trace 200 that consist of "@#" such as "@", "@13", etc., represent the position information. In the current example of query 105, the "SELECT" statement (e.g., "Select t2.b/t2.a from t2 where t2.b>0.") includes a single row. This is why position information "@#" included in exemplary execution plan trace 200 shows a column number rather than a row and a column number. It should be appreciated, however, that exemplary execution plan trace 200 can include position information "@<#, #>" (e.g., "@<2, 8>") that shows both a row and a column number to precisely point the starting symbol of a query token that causes a runtime error. For example, when a relational operator statement is longer than a single row.

Figure 3A:
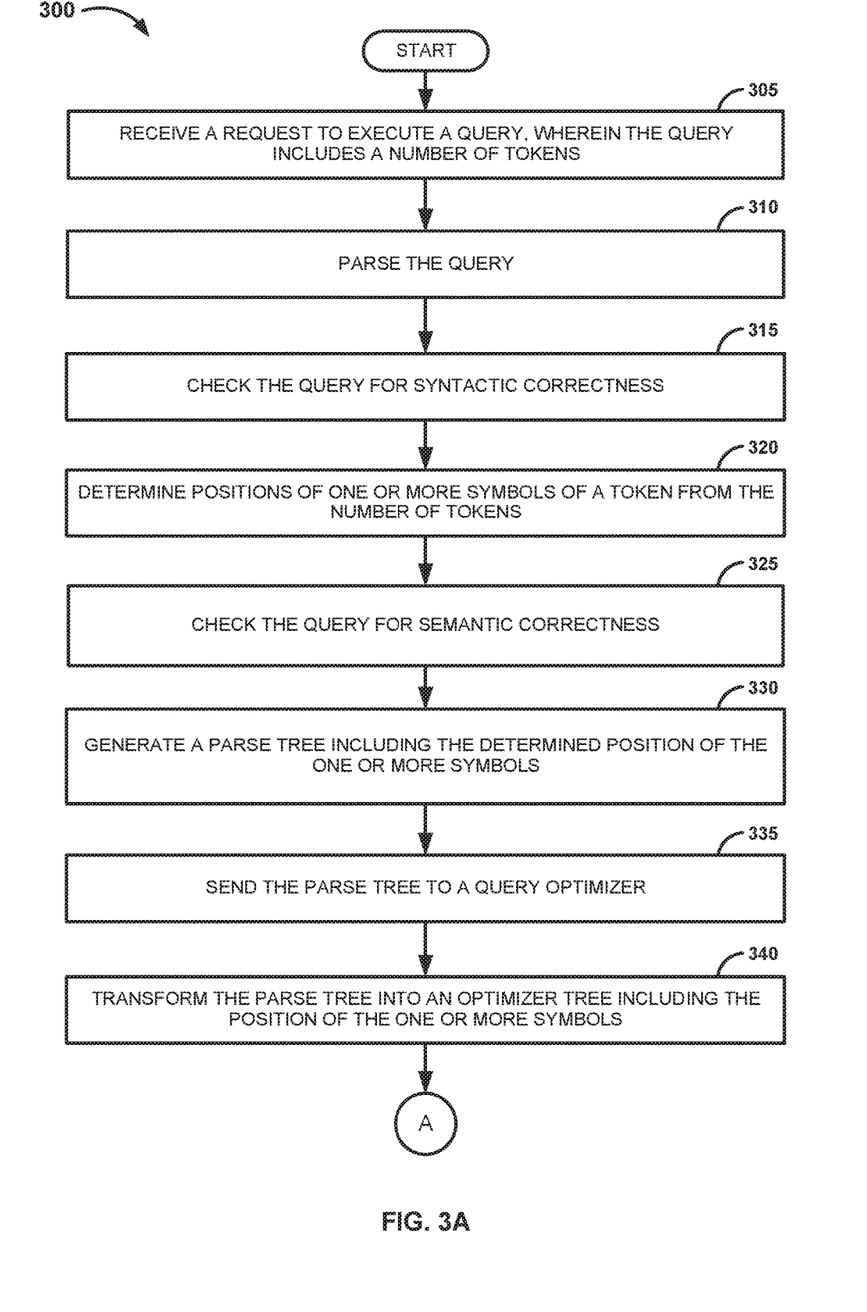
FIGS. 3A-B are flow diagrams illustrating a process that provides position data in an exception message associated with a runtime error, according to one embodiment.
Figure 3B:
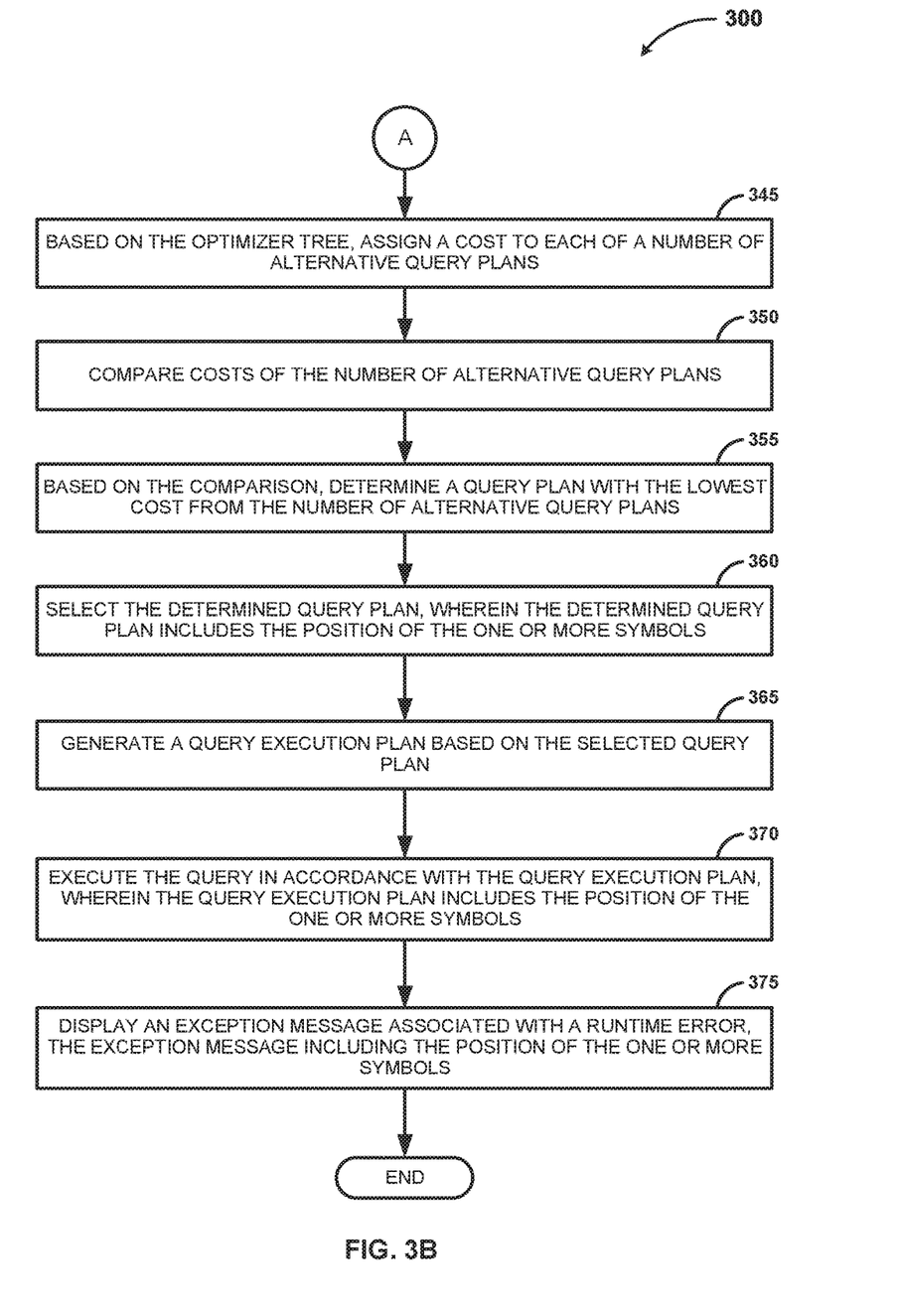

FIGS. 3A-B are flow diagrams illustrating process 300 that provides position data in an exception message associated with a runtime error, according to one embodiment. Process 300 starts at 305 (FIG. 3A), where a request to execute a query is received. For example, a database management system (DBMS) such as the DBMS described above with reference to FIG. 1 receives the request.

In one embodiment, the query includes a number of tokens. A token is a symbol or a group of symbols that is recognized as a single unit by the DBMS. Next, at 310, the query is parsed. For example, a parser of the DBMS parses the query. Further, at 315, the query is checked for syntactic correctness. The check for syntactic correctness is performed based on a grammar of the language of the query. For example, when the query is an SQL query, the syntactic correctness check is performed based on SQL grammar.

Upon the syntactic correctness check, at 320, positions of symbols of the number of tokens included in the query are determined. In one embodiment, the DBMS parser scans the query to determine the positions of the symbols of the query. Next, at 325, the query is checked for semantic correctness. In one embodiment, a checker of the DBMS traverses the query to perform the semantic correctness check. For example, it is checked whether table names from the query refer to existing tables and columns of database tables referred in the query are defined for the corresponding database tables.

Next, at 330, a parse tree including the determined position of the symbols is generated. The parse tree represents a data structure stored in memory that includes the positions of the symbols of the query. In one embodiment, the DBMS is described by a corresponding body of source code (e.g., codebase of the DBMS). A portion of the codebase defines parse trees. The portion defines a number of parse tree fields including a field that stores position information for the symbols of the query. Similarly, the DBMS codebase includes portions of source code that define optimizer trees, alternative query plans, and query execution plans, among others.

Upon generation of the parse tree, at 335, the parse tree is sent to an optimizer of the DBMS. The DBMS optimizer transforms, at 340, the parse tree into an optimizer tree. In one embodiment, the optimizer tree contains one or more relational operators such as projection, selection, join, etc. During transformation, the position information for the symbols of the query is also included in the optimizer tree. For example, a field for storing position information is defined in a portion of source code describing optimizer trees. Thus, the DBMS optimizer is configured to include the position information for the symbols of the query in the corresponding field of the optimizer tree.

Process 300 continues at 345 (FIG. 3B), where costs are assigned to a number of alternative query plans. An alternative query plan of the number of alternative query plan is based on the one or more relational operators included in the optimizer tree. In one embodiment, a field for storing position information for the symbols of the query is defined in a portion of source code that describes alternative query plans. Thus, position data is included from the optimizer tree into the alternative query plans.

In one embodiment, the costs are assigned to the alternative query plans by computing a number of logical alternatives of the optimizer tree and a number of available algorithms for execution of the one or more relational operators and one or more expressions included in optimizer tree.

Next, at 350, costs of the alternative query plans are compared. At 355, based on the comparison, a query plan with the lowest cost from the number of alternative query plans is determined. The determined query plan with the lowest cost is selected at 360. The determined query plan includes the position information for the symbols of the query.

Next, at 365, a query execution plan is generated for execution of the query. The query execution plan is generated based on the selected query plan. In the codebase of the DBMS, a portion of source code describing query execution plans defines a number of fields for query execution plans. The defined fields for the query execution plans include a field to store position information for the symbols of the query. Thus, the DBMS optimizer is configured to copy the position information from the corresponding field of the selected query plan into the generated query execution plan.

Upon generation of the query execution plan, at 370, the query is executed in accordance with the query execution plan. In one embodiment, the query execution plan is sent from the DBMS optimizer to an execution engine of the DBMS. The DBMS execution engine executes the query according to the query execution plan.

Process 300 ends at 375, where an exception message associated with a runtime error is displayed. When a runtime error occurs, the query execution engine executes predefined procedures as described in a corresponding part of the codebase of the DBMS. In one embodiment, the query execution engine reads data from the fields defined for the query execution plan and appends the read data to the exception message associated with the runtime error. The appended data includes the position information for the symbols of the query.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape: optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 4:
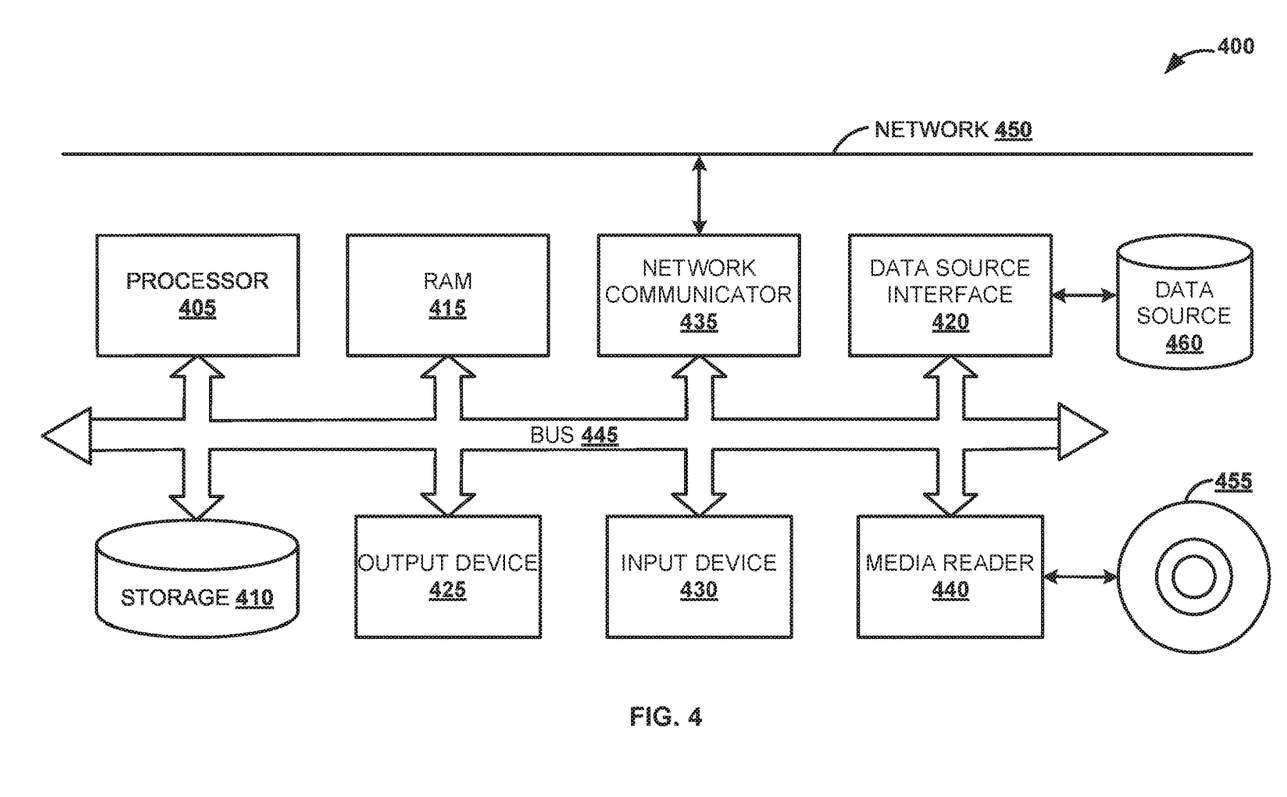
FIG. 4 is a block diagram of an exemplary computer system, according to one embodiment.

FIG. 4 is a block diagram of an exemplary computer system 400. The computer system 400 includes a processor 405 that executes software instructions or code stored on a computer readable storage medium 455 to perform the above-illustrated methods. The processor 405 can include a plurality of cores. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. According to some embodiments, such as some in-memory computing system embodiments, the RAM 415 can have sufficient storage capacity to store much of the data required for processing in the RAM 415 instead of in the storage 410. In some embodiments, all of the data required for processing may be stored in the RAM 415. The stored instructions may be further compiled to generate other representations of the instructions and dynamically stored in the RAM 415. The processor 405 reads instructions from the RAM 415 and performs actions as instructed. According to one embodiment, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A method implemented by a computer system in response to execution of program instructions by a processor of the computing system, the method comprising:

receiving, by the processor, a request to execute a query the query comprising a statement including a plurality of symbols and representing a request for data;

parsing, by the processor, the query;

determining, by the processor, a position of each of the plurality of symbols in the query;

generating, by the processor based on the parsed query, a parse tree comprising the determined position of the plurality of symbols;

transforming, by the processor, the parse tree into an optimizer tree including the determined position of the plurality of symbols, the optimizer tree being a data structure including a field that stores the determined position of the plurality of symbols;

generating a query execution plan, by the processor, by converting the optimizer tree including the determined position of the plurality of symbols into the query execution plan, the query execution plan being a data structure wherein a portion of source code corresponding to the query execution plan defines a field of the query execution plan storing the determined position of the plurality of symbols;

executing, by a query execution engine, the query in accordance with the query execution plan; and displaying, in response to a runtime error associated with the execution of the query, an exception message, the exception message including the determined position of the symbol associated with the runtime error.

2. The method of claim 1, further comprising:
determining a syntactic correctness for the query; and
determining a semantic correctness for the query.

3. The method of claim 1, wherein the generating of the query execution plan comprises:
evaluating, by the processor, a plurality of alternative query plans; and
selecting, by the processor based on the evaluation, a query plan from the plurality of alternative query plans.

4. The method of claim 3, wherein the evaluating of the plurality of alternative query plans comprises:
calculating, by the processor, a cost for each of the plurality of alternative query plans;
comparing, by the processor, the calculated costs of each of the plurality of alternative query plans; and
determining, by the processor based on the comparison, the query plan having the lowest cost from the plurality of alternative query execution plans.

5. A non-transitory computer readable medium storing processor-executable program instructions, the medium comprising:
instructions to receive a request to execute a query, the query comprising a statement including a plurality of symbols and representing a request for data;
instructions to parse the query;
instructions to determine a position of each of the plurality of symbols in the query;
instructions to generate, based on the parsed query, a parse tree comprising the determined position of the plurality of symbols;
instructions to transform the parse tree into an optimizer tree including the determined position of the plurality of symbols, the optimizer tree being a data structure including a field that stores the determined position of the plurality of symbols;
instructions to generate a query execution plan by converting the optimizer tree including the determined position of the plurality of symbols into the query execution plan, the query execution plan being a data structure, wherein a portion of source code corresponding to the query execution plan defines a field of the query execution plan storing the determined position of the plurality of symbols;
instructions to execute the query in accordance with the query execution plan; and
instructions to display, in response to a runtime error associated with the execution of the query, an exception message, the exception message including the determined position of the symbol associated with the runtime error.

6. The computer readable medium of claim 5, further comprising:
instructions to determine a syntactic correctness of the query; and
instructions to determine a semantic correctness of the query.

7. The computer readable medium of claim 5, wherein the generating of the query execution plan further comprises:
instructions to evaluate a plurality of alternative query plans; and
instructions to select, based on the evaluation, a query plan from the plurality of alternative query plans.

8. The computer readable medium of claim 7, wherein evaluate the plurality of alternative query plans further comprises:
instructions to calculate a cost for each of the plurality of alternative query plans;
instructions to compare the calculated costs of each of the plurality of alternative query plans; and
instructions to determine, based on the comparison, a query plan having the lowest cost from the plurality of alternative query execution plans.

9. A system comprising:
a computing device comprising:
a memory storing processor-executable program instructions; and
a processor to execute the processor-executable program instructions to cause the computing device to:
receive, by the processor, a request to execute a query, the query comprising a statement including a plurality of symbols and representing a request for data;
parse the query;
determine, by the processor, a position of each of the plurality of symbols in the query;
generate a parse tree comprising the determined position of the plurality of symbols;
transform the parse tree into an optimizer tree including the determined position of the plurality of symbols, the optimizer tree being a data structure including a field that stores the determined position of the plurality of symbols;
generate a query execution plan by converting the optimizer tree including the determined position of the plurality of symbols into the query execution plan, the query execution plan being a data structure wherein a portion of source code corresponding to the query execution plan defines a field of the query execution plan storing the determined position of the plurality of symbols;
execute, by a query execution engine, the query in accordance with the query execution plan; and
display, in response to a runtime error associated with the execution of the query, an exception message, the exception message including the determined position of the symbol associated with the runtime error.

10. The system of claim 9, further comprising causing the computing device to:
determine a syntactic correctness for the query; and
determine a semantic correctness for the query.

11. The system of claim 9, wherein the generating of the query execution plan comprises:
evaluating a plurality of alternative query plans; and
selecting, based on the evaluation, a query plan from the plurality of alternative query plans.

12. The system of claim 11, wherein the evaluating of the plurality of alternative query plans comprises:
calculating a cost for each of the plurality of alternative query plans;
comparing the calculated costs of each of the plurality of alternative query plans; and
determining, based on the comparison, the query plan having the lowest cost from the plurality of alternative query execution plans.

* * * * *